April 3, 1962 R. C. POCOCK 3,027,979
BRAKE STRUCTURE

Filed April 16, 1959 2 Sheets-Sheet 1

INVENTOR.
ROBERT C. POCOCK
BY
William P. Hickey
ATTORNEY

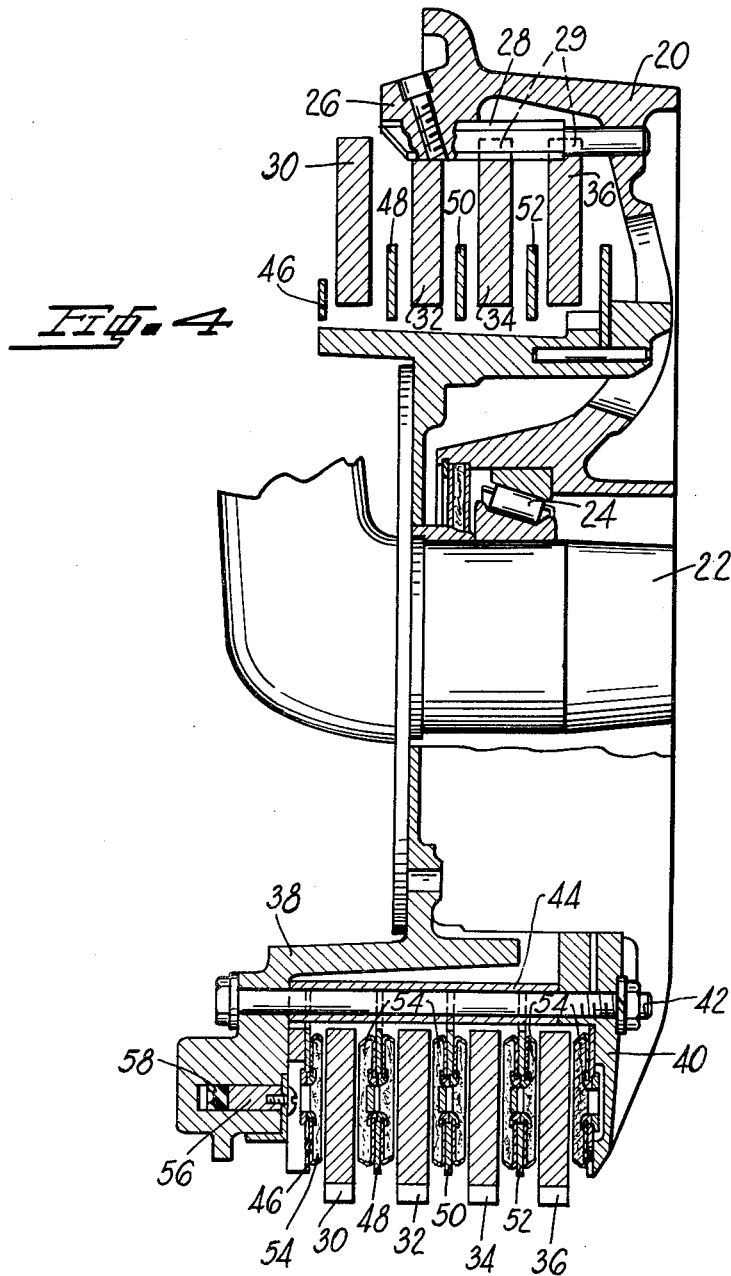

United States Patent Office 3,027,979
Patented Apr. 3, 1962

3,027,979
BRAKE STRUCTURE
Robert C. Pocock, South Bend, Ind., assignor to The
Bendix Corporation, a corporation of Delaware
Filed Apr. 16, 1959, Ser. No. 806,859
6 Claims. (Cl. 188—72)

The present invention relates to the art of friction compositions for use in clutch and brake devices, or the like. The invention is particularly useful in high kinetic-energy-absorbing devices, but also finds application in low kinetic-energy-absorbing devices.

The present application is a continuation-in-part of my copending applications Serial Nos. 600,808, now abandoned, and 640,622, now patent No. 2,938,790. Application Serial No. 600,808 is a continuation of the now abandoned application Serial No. 257,292, filed November 20, 1951. Application Serial No. 640,622 is a division of application Serial No. 545,637, now patent No. 2,784,105, which in turn is a continuation-in-part of the now abandoned application Serial No. 257,162 filed on November 19, 1951.

Friction composition lining or segments may be characterized as falling generally within two categories, namely, organic and inorganic. Organic linings are almost universally used on automotive vehicles and are used to an appreciable extent on aircraft. Inorganic friction materials (other than solid metals) have not as yet found widespread use in the brake and clutch art, and the reason is believed to be primarily the instability of the frictional properties over the desired wear-life of the friction article. One major definciency of prior art friction articles resides in the reduction of the coefficient of friction after a number of high temperature service applications have been made, and this obviously is undesirable because the performance is directly dependent upon the frictional properties of the articles.

Therefore, it is a principal object of this invention to provide a friction article which possesses a relatively stable or desirable coefficient of friction throughout its wear-life on the clutch, brake, etc. A further object is to provide such a friction article which, by reason of resistance to high temperatures, is especially suited for use in heavy duty applications. A still further object is to provide a friction article which will maintain substantially uniform friction-producing surfaces after repeated operations under high temperature conditions and in heavy duty applications. For example, aircraft brakes, when applied, are heated to extremely high temperatures in a matter of a few seconds, and current demands are such that the capacities of many friction articles have been materially exceeded. Consequently, a new and more rugged article is needed for such conditions, and it is a further object of this invention to fulfill this need.

In the drawings:

FIGURE 4 is a sectional illustration of a disc brake incorporating an embodiment of this invention.

Figure 1:
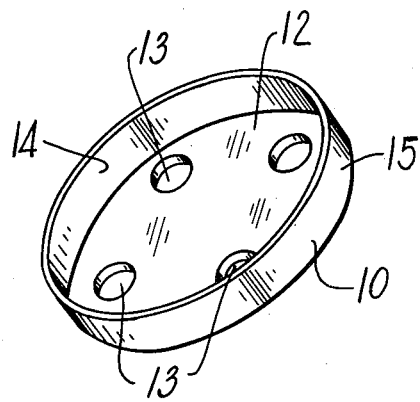
FIGURE 1 is a perspective view of a retaining cup used in an embodiment of this invention.
Figure 2:
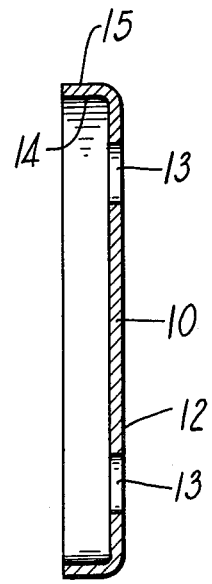
FIGURE 2 is a cross section of FIGURE 1.
Figure 3:
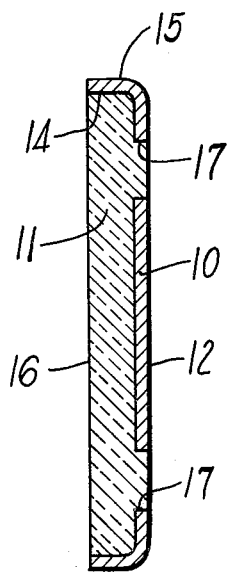
FIGURE 3 is a cross section of the retaining cup and matrix material after sintering.

Referring to the drawings, a steel cup 10 which is used for retaining the friction material 11 is cylindrically shaped, the closed or bottom end 12 being provided with a plurality of holes 13. The inner surface 14 of the retainer 10 may be prepared for copper electro-plating by etching or other suitable means, and the surface then copper plated. However, it is to be understood that such plating is not necessarily required. The sides 15 of the cup may be inclined somewhat toward the center of the cylinder by means of a coining operation. This serves to seat the friction material firmly. The purpose of making holes 13 in the bottom of the cup 12 is to provide surfaces at which the bonding or gripping of the friction material to the cup can take place.

In processing, a powdered mixture of suitable composition is poured into the retaining cup 10 and pressure is then applied at the open surface 16 to mold the mixture into intimate contact with all parts of the cup including the peripheral portions 17 at the bottom of the cup defined by the holes 13. The pressure is then released and the cup may then be coined, an operation consisting of forming the walls of the cup inwardly if this is desired. The walls will, if formed inwardly, exert a component of force perpendicular to the bottom of the cup and serve thereby to seat the compact. The mixture is compressed by applying pressure at the face of the cup 16 to make the compact more rigid and dense and to assume the inner shape of the cup and may be performed after the sintering operation if desired.

The mixture in its finely divided, uncompacted state has properties similar to that of a fluid; that is, a pressure extered on it in one direction will be transmitted in all directions with equal magnitude. From analyzing the shape of the container, it will be seen that the compacting pressure will cause the mixture to exert forces on the peripheral surfaces of the regions defined by the holes 13. The mixture will, however, lose its property of "fluidity" after being compressed. The compacting pressure transmitted to the regions defined by the holes 13 will not be entirely relieved when the compacting process is completed, but will remain in a static compression state. In other words, diametric expanding forces are present in the material inside the holes 13 which provide intimate pressure contact between the hole peripheries and the material.

Next, the compacted unit is sintered in a reducing atmosphere until the materials are coalesced and adhered to each other into an integrated mass. The reducing atmosphere tends to prevent the formation of harmful oxides and is believed to remove to some extent the free oxygen entrained in the compact and especially the metallic oxides and oxygen at the areas of contact between the peripheral surfaces of the holes 13 and the material. This provides a substantially pure metal-to-metal contact, and if the material has copper as a predominant ingredient and the cup is steel, the result during sintering is relatively pure copper to pure steel contact. Suitable sintering temperatures range between 1100° F. and 1900° F., and sintering times may range between twenty minutes to one and one-half hours.

The finely divided material which fills the cups referred to hereinbefore may consist of any of the well known materials which may be directly adhered to a steel reinforcement by sintering operations without the use of brazing, soldering, welding or the like operations. An example of such materials is as follows, the percentages referring to weight: copper 16% to 85%, zinc and/or tin 1% to 41%, and silica 3% to 30%.

These specified ranges are not intended to set off critical limits outside of which the present invention would have no application, but are mentioned to provide a guide as to what materials may successfully be used in the practice of this invention.

Typical compositions which may be used to produce a brake or clutch facing, or lining, are as follows (the percentages of the ingredients being by weight):

*Formula A*

Percent
Copper _____ 16 to 86

Formula A—Continued

| | Percent |
|---|---|
| Zinc and/or tin | 1 to 41 |
| Iron | 2 to 38 |
| Graphite | 2 to 19 |
| Calcined kyanite | 3 to 55 |

Formula B

| | |
|---|---|
| Copper | 27 to 68 |
| Zinc and/or tin | 2 to 32 |
| Iron | 3 to 30 |
| Quartz | 5 to 19 |
| Graphite | 1 to 13 |
| Calcined kyanite | 1 to 55 |

Formula C

| | |
|---|---|
| Copper | 16 to 86 |
| Zinc and/or tin | 1 to 41 |
| Iron | 1 to 30 |
| Lead | 1 to 20 |
| Quartz | 1 to 20 |
| Graphite | 1 to 13 |
| Calcined kyanite | 4 to 55 |

Formula D

| | |
|---|---|
| Copper | 40.0 |
| Calcined kyanite | 60.0 |

Formula E

| | |
|---|---|
| Copper | 30.0 |
| Calcined kyanite | 70.0 |

Formula F

| | |
|---|---|
| Copper | 35.0 |
| Relatively pure mullite | 65.0 |

Formula G

| | |
|---|---|
| Nickel | 57 |
| Monel [1] | 5 |
| Silica | 5 |
| Graphite | 3 |
| Calcined kyanite | 30 |

[1] Nickel 68% to 70%, copper 28% to 30%, silicon 2% to 3%.

Formula H

| | |
|---|---|
| Cobalt | 65 |
| Silica | 5 |
| Graphite | 20 |
| Calcined kyanite | 20 |

Formula I

| | |
|---|---|
| Iron | 75 |
| Silica | 5 |
| Calcined kyanite | 20 |

Formula K

| | |
|---|---|
| Copper-lead (same as in Formula L) | 68 |
| Quartz | 5 |
| Graphite | 1 |
| Calcined kyanite | 26 |

Formula L

| | |
|---|---|
| Brass chips | 29 |
| Copper-lead [1] | 39 |
| Quartz | 5 |
| Graphite | 1 |
| Calcined kyanite | 26 |

[1] This material in raw state is atomized copper-lead powder in the proportion of 65 parts copper to 35 parts lead and will pass through a 200 mesh screen.

It should be here stated that there are two reasons for copper plating the retaining cup, the first being to provide an interface between the cup and compact which serves as a joining or bonding medium therebetween in brazing the two bodies together. This interface is shown as the dark line 18 in FIGURE 5 and under microscopic examination blends into the materials of both bodies. This bond, in conjunction with the forces of friction between the compact and cup sides 15, rigidly secures the parts together. The cup sides provide appreciable lateral support against the compact shearing away during a service appliaction. Further, as the second of the above-mentioned two reasons, the copper plate protects the cup from decarbonizing or oxidizing during the sintering operation, both or either of these two reactions, if allowed to occur, serving to weaken the bond between the cup and compact.

Figure 5:
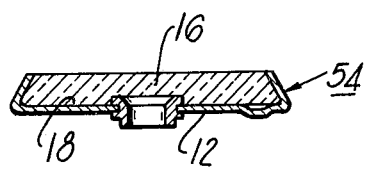
FIGURE 5 is a cross section of a slightly different embodiment from that shown in FIGURE 1.

There are two methods by which our improved fritcion material may be produced, the one just described being generally to compact the powders into the retaining cup, then sintering. As the second method, instead of compacting in the cup proper, a die having a concavity substantially the equal of the cup is used to receive the powders which are therein compacted and after removal in compact form, sintered under substantially the same conditions as before. However, the resultant article is formed with a bevelled peripheral surface at an angle of about 75 degrees to the bottom face. Next, the compact is placed in a cup (not necessarily copper plated) and a coining operation performed thereon during which the cup sides are forced against the peripheral surface of the compact. Thus, as seen in FIGURE 5, a mechanical clamping arrangement is provided for securing the assembly together. The coining operation develops substantial axial pressure on the compact and cup so as to fill out any voids which may occur between the cup and compact or in the compact itself, and to bring the thickness of the over-all assembly within tolerance dimensions.

The article as illustrated in the drawings may conveniently be incorporated in a disc brake as disclosed in Du Bois et al. Patent 2,483,362. A mere substitution of the article for the Du Bois et al. patent "friction material" is all that is necessary, and this may be accomplished by fastening the bottom 12 of the compact of FIGURE 5, by welding or the like, to one of the nonrotatable discs so that the friction face 16 is juxtaposed with one of the rotatable brake discs. Generally speaking, wherever an organic friction lining segment is used in disc brakes, an article of this invention may be substituted therefor. In certain instances, slight design changes may be necessary in the brake to accommodate the new form of article.

In illustration of how the present invention may be adapted for use in an aircraft brake, reference is made to FIGURE 4 for an illustration of such adaptation, the brake of this figure being closely similar to the one illustrated and claimed in Du Bois et al. Patent 2,483,362. In this figure, a wheel 20 is rotatably supported on axle 22 by means of bearings 24. This wheel is provided with an overhanging rim portion 26 which is equipped with a plurality of driving keys 28, said keys extending axially through peripheral slots 29 in rotatable discs 30, 32, 34, and 36 to drive the same. The number of rotating discs may be varied according to the requirements of the particular brake installation. These discs are movable axially along the driving keys 28 for frictional contact with the cooperating nonrotating disc members of the brake structure.

These nonroating disc members are supported on a fixed member 38, which is suitably secured to axle 22. The member 38 has a nonrotatable and axially fixed disc 40 held thereon by means of a plurality of through bolts 42. Sleeves 44 are mounted on the bolts 42 and serve as anchors for four axially movable but nonrotatable discs 46, 48, 50 and 52. Both sides of discs 48, 50 and 52 are provided with the friction articles or compacts 54 made according to the foregoing explanation of this invention. Also, the left face of disc 40 and the right face of disc 46 are provided with compacts 54. These compacts 54 may be used in any desired number, and as illustrated are used in sufficient number to be equally spaced about the circumferential extents of the discs.

The actuating means for exerting compressive force on the brake discs comprises a piston 56 which is movable axially within a chamber 58 provided in the member 38. The piston 56 and its associated chamber 58 are, in the present instance, O-shaped.

Any means may be used to fasten the compacts 54 to the corresponding discs, and as illustrated, a rivet-type fastening is used. Whatever type of connection is used, it is essential that it be of sufficient strength to retain the compact on the respective disc during the extreme shear loads produced by braking applications. Thus, it is possible that the bottom of the compact cups may be welded by means of a convenient process to the disc members.

In operation, fluid under pressure is introduced into chamber 58 to drive piston 56 toward the right. Piston 56 then forcibly engages nonrotatable disc 46 and thereby compresses all of the disc into frictional interengagement against the backing member 40. For release of the brakes, the fluid pressure introduced into chamber 58 is relieved, thereby allowing disengagement of the disc members. During frictional engagement of the discs, the friction faces 18 of compacts 54 directly engage the rotating discs 30, 32, 34 and 36, respectively, so as to produce the desired braking torque.

In the use of the present invention, it has been found that even with extended heavy duty use, the coefficient of friction of the article will remain relatively constant throughout the wear-life thereof, and in some cases will actually increase slightly as wear progresses. Stated in other words, there is generally no tendency toward a deteriorating coefficient of friction as in the use of prior art friction articles.

The terms "friction article" and "friction composition" as used herein mean and include, and are intended to mean and include, friction segments or lining having use in brakes, clutches, or the like devices, as one part of the principal friction-producing elements of the devices. For example, the article of the present invention could be used as lining for the brake shoes in the conventional automotive vehicle drum brake assemblies or as linings on friction elements of disc brakes. Of course, the means by which the actual friction-producing article of this invention may be fastened in the clutch or brake assemblies may vary to suit design requirements.

The numerous specific formulation cited in this specification are merely examples of useful combinations of ingredients, and are not intended to detract from the breadth of the concept that constitutes applicant's invention.

Although several embodiments of the invention have been illustrated and described, various changes in the form and relative arrangements of the parts or ingredients may be made to suit requirements.

I claim:

1. In an aircraft brake and the like: first and second generaly parallel disc-like members rotatable relative to each other about an axis perpendicular to said members, said first member having a flat annular friction producing surface perpendicular to said axis, at least one container member having a generally flat back and sidewall portions which project outwardly a generally predetermined distance from said back, said sidewalls of said container member being made from a metal, means rigidly fastening said flat back of said container member to said second member with its sidewalls projecting toward said surface of said first member for engagement therewith, sintered powdered mixture of metallic and ceramic materials filling said container to a level forming a friction producing surface which includes the outer edges of said sidewalls of said container, means for rotating said friction producing surfaces of said first and second members relative to each other, and means for forcing said discs axially into engagement with each other when said surfaces are moving relative to each other, said last two means creating sufficient frictional contact to generate surface temperatures above approximately 2500° F.

2. In an aircraft brake and the like: first and second generaly parallel disc-like members rotatable relative to each other about an axis perpendicular to said members, said first member having a flat annular friction producing surface perpendicular to said axis, at least one container member having a generally flat back and sidewall portions which project outwardly a generally predetermined distance from said back, said sidewalls of said container member being made from a metal, means rigidly fastening said flat back of said container member to said second member with its sidewalls projecting toward said surface of said first member for engagement therewith, a sintered powdered mixture of metallic and ceramic materials filling said container to a level forming a friction producing surface which includes the outer edges of said sidewalls of said container, means for rotating said friction producing surfaces of said first and second members relative to each other, and means for forcing said discs axially into engagement with each other when said surfaces are moving relative to each other, said last two means creating sufficient frictional contact to generate surface temperatures above approximately 2500° F., said sidewall portions of said container member being deformed inwardly against its contents to maintain a bias thereagainst which pervents separations of said sidewalls from said sintered powdered mixture contained therein during sliding engagement of said container member with said friction producing surface of said first member.

3. In an aircraft brake and the like: first and second generally parallel disc-like members rotatable relative to each other about an axis perpendicular to said members, said first member having a flat annular friction producing surface perpendicular to said axis, at least one container member having a generally flat back and cylindrically shaped sidewalls which project outwardly a generally predetermined distance from said back, said sidewalls of said container member being made from a ferrous metal, means rigidly fastening said flat back of said container member to said second member with its sidewalls projecting toward said surface of said first member for engagement therewith, a sintered powdered mixture of metallic and ceramic materials filling said container to a level forming a friction producing surface which includes the annular outer edges of said sidewalls of said container, means for rotating said friction producing surfaces of said first and second members relative to each other, and means for forcing said discs axially into engagement with each other when said surfaces are moving relative to each other, said last two means creating sufficient frictional contact to generate surface temperatures above approximately 2500° F., said sidewalls of said container member being deformed inwardly to hold the sidewalls in engagement with the contents of said container to prevent separation of said sidewalls from said sintered powdered mixture contained therein during sliding engagement of said container member with said friction producing surface of said first member.

4. In an aircraft brake and the like: first and second generally parallel disc-like members rotatable relative to each other about an axis perpendicular to said members, said first member having a flat annular friction producing surface perpendicular to said axis, at least one container member having a generally flat back and sidewall portions which project outwardly a generally predetermined distance from said back, said sidewalls of said container member being made from steel, means rigidly fastening said flat back of said container member to said second members with its sidewalls projecting toward said surface of said first member for engagement therewith, a sintered powdered mixture of metallic and nonmetallic refractory materials filling said container to a level forming a friction producing surface which includes the outer edges of said sidewalls of said container, said material comprising approximately 55–85% of a strong sinterable metal, approximately 3%–30% ceramic, and approximately 0–15% graphite, means for rotating said friction producing surfaces of said first and second members relative to each other, and means for forcing said discs axially into engagement with each other when said surfaces are moving relative to each other, said last two means creating sufficient frictional contact to generate surface temperatures above approximately 2500° F.

5. In a brake and the like: an annular relatively thin rotor member having a friction surface which must be kept substantially free of scoring, a stator member spaced from said rotor member, said stator member including at least one ferrous container member, said container member having sidewall portions projecting toward said friction surface of said rotor member, a sintered heat resistant mixture of metallic and ceramic powders filling said container member and forming a friction surface for rubbing contact with said friction surface of said rotor member which friction surface of said container member includes the end surfaces of said sidewalls of said container member, means for rotating said friction producing surfaces relative to each other, and means for forcing said friction surfaces into engagement with each other when said surfaces are moving relative to each other, said last two means creating sufficient frictional contact to generate high surface temperatures wherein an iron oxide lubricant is produced.

6. In a brake and the like: a first member having a friction surface which must be kept substantially free of scoring, a second member spaced from said first member, said second member including at least one ferrous container member, said container member having sidewall portions projecting toward said friction surface of said first member, a sintered heat resistant mixture of metallic and ceramic powders filling said container member and forming a friction surface for rubbing contact with said friction surface of said first member and which friction surface of said container member includes the end surfaces of said sidewalls of said container member, means for rotating said friction producing surfaces relative to each other, and means for forcing said friction surfaces into engagement with each other when said surfaces are moving relative to each other, said last two means creating sufficient frictional contact to generate high surface temperatures wherein an iron oxide lubricant is produced.

References Cited in the file of this patent
UNITED STATES PATENTS

| | | |
|---|---|---|
| 610,327 | Kelly | Sept. 6, 1898 |
| 1,114,343 | De France | Oct. 20, 1914 |
| 1,953,217 | Evans | Apr. 3, 1934 |
| 1,954,521 | Cunningham | Apr. 10, 1934 |
| 2,097,942 | Whitney | Nov. 2, 1937 |
| 2,326,961 | McCune | Aug. 17, 1943 |
| 2,389,061 | Kuzmick | Nov. 13, 1945 |
| 2,671,532 | Du Bois | Mar. 9, 1954 |
| 2,784,105 | Stedman et al. | Mar. 5, 1957 |
| 2,806,570 | Markus | Sept. 17, 1957 |